(12) United States Patent
Campbell

(10) Patent No.: US 7,166,316 B2
(45) Date of Patent: Jan. 23, 2007

(54) FAT REPLACEMENT MATERIAL AND METHOD OF MANUFACTURE THEREOF

(75) Inventor: Lydia Johanna Campbell, Milnathort (GB)

(73) Assignee: Nandi Proteins Limited, Edinburgh (GB)

(*) Notice: Subject to any disclaimer, the term of this patent is extended or adjusted under 35 U.S.C. 154(b) by 535 days.

(21) Appl. No.: 10/450,999

(22) PCT Filed: Dec. 19, 2001

(86) PCT No.: PCT/GB01/05648

§ 371 (c)(1),
(2), (4) Date: Jun. 19, 2003

(87) PCT Pub. No.: WO02/49442

PCT Pub. Date: Jun. 27, 2002

(65) Prior Publication Data

US 2004/0047974 A1 Mar. 11, 2004

(30) Foreign Application Priority Data

Dec. 19, 2000 (GB) ................................. 0030926.0

(51) Int. Cl.
*A23J 1/20* (2006.01)

(52) U.S. Cl. .................................. 426/657; 426/804

(58) Field of Classification Search .................... None
See application file for complete search history.

(56) References Cited

U.S. PATENT DOCUMENTS

| | | | |
|---|---|---|---|
| 3,620,757 A | 11/1971 | Ellinger et al. | |
| 3,628,968 A | 12/1971 | Noznick et al. | |
| 3,930,039 A | 12/1975 | Kuipers | |
| 4,163,069 A | 7/1979 | Melachouris et al. | |
| 4,675,201 A * | 6/1987 | Lee et al. | 426/573 |
| 4,720,390 A | 1/1988 | Bächler et al. | |
| 4,734,287 A | 3/1988 | Singer et al. | |
| 4,855,156 A * | 8/1989 | Singer et al. | 426/565 |
| 4,961,953 A * | 10/1990 | Singer et al. | 426/656 |
| 4,985,270 A * | 1/1991 | Singer et al. | 426/565 |
| 5,080,921 A | 1/1992 | Reimer | |
| 5,217,741 A | 6/1993 | Kawachi et al. | |
| 5,350,590 A | 9/1994 | McCarthy et al. | |
| 5,476,588 A * | 12/1995 | Nagaoka | 210/499 |
| 5,494,696 A | 2/1996 | Holst et al. | |
| 6,187,368 B1 * | 2/2001 | Gibson et al. | 426/656 |

FOREIGN PATENT DOCUMENTS

| | | |
|---|---|---|
| EP | 0 788 747 | 8/1977 |
| EP | 0 412 590 A | 2/1991 |
| EP | 0 579 328 A | 1/1994 |
| EP | 0619 075 A | 10/1994 |
| EP | 0 779 035 A | 6/1997 |
| EP | 0 788 747 A | 8/1997 |
| EP | 1 042 960 A | 10/2000 |
| GB | 2 055 846 A | 3/1981 |
| GB | 2 063 273 | 6/1981 |
| WO | WO 91/17665 | 11/1991 |
| WO | WO 00/48473 | 8/2000 |
| WO | WO 02/49442 | 6/2002 |
| WO | WO 03/011040 | 2/2003 |

OTHER PUBLICATIONS

Christopher Schmitt, et al, "Structure and Technofunctional Properties of Protein-Polysaccharide Complexes: A Review", Critical Reviews in Food Science and Nutrition, 1998, CRC Press LLC, pp. 689-753.

N. Kitabake and E. Doi, Conformational Change of Hen Egg Ovalbumin during Foam Formation Detected by 5,5'-Dithobis, *J. Agric. Food Chem.* (1987) vol. 35, pp. 953-953.

M. Corredig and D. Dalgleish, A Differencial Microcalorimetric Study of Whey Proteins and their Behaviour in Oil-Water Emulsions, *Colloids and Surfaces B: Biointerfaces* 4 (1995) pp. 411-422.

* cited by examiner

*Primary Examiner*—Carolyn Paden
(74) *Attorney, Agent, or Firm*—Venable LLP; Catherine M. Voorhees; Kavita B. Lepping

(57) ABSTRACT

The present invention provides a method for the manufacture of a fat replacement material suitable for use in the manufacture of food products. The method comprises the steps of:

a) providing a substantially homogeneous aqueous fluid containing albumin and at least one stabilizer selected from a sugar and salt;

b) subjecting the fluid to a controlled heat treatment at a temperature and for a period of time not less and not greater than that sufficient for obtaining from 50 to 100% denaturation of the albumin; and c) spray drying of the heat treated fluid.

The invention also provides a fat replacement material comprising a spray dried powder comprising an intimate admixture of 1 part by weight of from 50 to 100% denatured albumin, and from 3 to 100 parts by weight of at least one stabilizer selected from a sugar and salt.

The material of the invention has excellent emulsifying properties as well as improved heat stability and resistance to acid conditions.

33 Claims, No Drawings

FAT REPLACEMENT MATERIAL AND METHOD OF MANUFACTURE THEREOF

CROSS-REFERENCE TO RELATED APPLICATIONS

This application is a national stage entry of PCT/GB01/05648 filed Dec. 19, 2001, which claims priority to UK Application No. 00309260, filed Dec. 19, 2000, both of which are hereby incorporated by reference.

FIELD OF THE INVENTION

The present invention relates to the manufacture of a fat replacement material suitable for use in the food industry.

BACKGROUND OF THE INVENTION

It has previously been proposed to use albumin proteins such as whey and egg white to substitute for fat to a greater or lesser extent so as to produce low-fat food products for which there is an ever increasing demand. It is however particularly important for safety reasons, when using albumin to ensure that it is properly pasteurized. When albumin is subjected to heat treatment, though, there is a considerable risk of the albumin coagulating and/or being hydrolyzed, which generally results in processing difficulties and adverse effects on the texture, mouth-feel, and other properties of the final food product in which it is used. Conventionally therefore manufacturers have gone to considerable lengths to avoid any denaturation of the albumin as far as possible in order to prevent the albumin from coagulating.

Whey is generally defined as the liquid byproduct from the manufacture of cheese and casein by the acid or rennet coagulation of milk. The whey obtained from acid coagulation is called acid whey and that obtained from rennet coagulation, sweet whey. Liquid whey generally consists of the following: 88.7% w/v water, 0.9% w/v protein (mostly lactalbumin), 5.1% w/v lactose, 0.3% w/v fat and 0.5% w/v minerals. The total solids content typically is in the range 5–10% w/v. Large scale drying techniques have in recent years been developed, which make the production of dry whey solids both technically possible and economically feasible. A large proportion of dried whey produced is still used as animal feed. Utilization of dried whey in food compositions for human consumption has been limited because of functional deficiencies inherent in dry whey solids such as insolubility. In most industrial processes the whey protein is purified by advanced ultrafiltration, microfiltration or ion-exchange techniques. This is followed by conventional spray-drying procedures. The whey protein thus obtained is not denatured and will form gels or coagulate when heated or acidified.

Liquid egg white typically comprises 88.5% w/v water and 9.8% w/v ovalbumin, with the balance made up of minor amounts of fat, minerals and glucose. Spray-dried native egg white and whey protein are often difficult to dissolve in water, coagulate when heated and acidified and have poor emulsification properties. Native whey and egg white do not denature when dried using conventional spray drying techniques: "although spray-dried products comes into contact with hot air, at no stage during the process does the product temperature become high enough to cause product denaturation" Spray drying handbook, Keith Masters, 5th edition. Publishers: Longman Scientific & Technical". Whole dry whey generally contains usually 12% w/v by weight of protein. It is an object of the present invention to avoid or minimize one or more of the above disadvantages.

It has now surprisingly been found that by carefully controlling the denaturation of albumin during pasteurization thereof, it is possible to obtain a fat replacement product which is safe and has very good processing characteristics, whilst being substantially free of coagulation or degradation resulting from hydrolysis thereof.

SUMMARY OF THE INVENTION

The present invention provides a method for the manufacture of a fat replacement material suitable for use in the manufacture of food products, which method comprises the steps of:

a) providing a substantially homogeneous aqueous fluid containing albumin and at least one stabilizer selected from a sugar and salt;

b) subjecting said fluid to a controlled heat treatment at a temperature and for a period of time not less and not greater than that sufficient for obtaining from 50 to 100% denaturation of said albumin; and c) spray drying of the heat treated fluid.

DETAILED DESCRIPTION OF THE INVENTION

We have found that by carefully controlling the heat treatment, it is possible to obtain a degree of denaturation (loss of secondary and/or tertiary structure) of the albumin which makes it highly suitable for use in fat replacement, whilst at the same time avoiding the risk of coagulation and/or hydrolysis which occur if heat treatment is allowed to continue for any significant period of time beyond that required to achieve 100% denaturation. Preferably the thermal treatment conditions are selected so as to obtain from 55 to 90% denaturation, advantageously from 60 to 80% denaturation. Desirably there is obtained at least 70% denaturation.

The fat replacement materials provided by the present invention provide a number of significant advantages over previously known materials. In general they have comparable or superior physical and processing qualities, whilst at the same time being considerably cheaper to produce. Thus, for example, whilst a current commercial process may take as long as 14 days to produce the material, the method of the present invention can be completed within just one or two days using normal batch processing procedures. The excellent properties of the materials of the present invention include inter alia the following:

1. Stability against heat and acid conditions. When dissolved in water in concentrations ranging from 0.1–70% w/v, thereby providing a protein concentration of up to 30% w/v, the onset of protein coagulation when heated, is substantially delayed and precipitation when acidified, substantially avoided. This is a significant improvement when compared to any spray-dried egg white or whey protein currently available in the food sector. The products can be used in pasteurized sauces, spreads (e.g. cheese spread) and innovative soft cheeses.

2. Excellent emulsifying capacity. The new materials can partially replace egg yolk in emulsions like mayonnaises and dressings, thereby lowering cholesterol content and reducing costs.

3. Improved solubility in water at room temperature.

Other advantageous properties which may be mentioned include inter alia improved foaming capacity, improved water binding resulting in improved thickening power and emulsion stabilixation properties, and reduced allergenicity.

The fat replacement materials of the current invention closely resemble the functionality of sodium caseinate in food applications. Sodium caseinate obtained by alkali neutralization of casein has found broad utility in dairy products such as coffee whiteners, whipped toppings, frozen desserts custards, processed cheese, sour creams, instant breakfasts, baby foods and the like. In compositions containing fat or oil and water, this ingredient serves to encapsulate the oil droplets and bind water, thus stabilizing the composition and prevents separation of oil from water. In compositions where air is beaten into the mixture, sodium caseinate serves to further bind the air bubbles to the encapsulated oil, and thus stabilize the foam, i.e. the air, water, fat system. The denatured albumin of the fat replacement materials of the present invention can effectively replace sodium caseinate in such products. The particular significance of this is that Na-caseinate is a very expensive raw material and the replacement thereof by the much more economically obtainable material of the present invention will lead to cost reduction of food products.

It will be appreciated that various different sets of conditions may be used to achieve a desired degree of denaturation with longer times being generally required at lower treatment temperatures and vice versa. The heat treatment conditions which can be safely used without coagulation of the albumin, will also depend on the nature and amount of stabilizer(s) used. At the same time it should also be borne in mind that certain stabilizers such as sugar and salt in particular, have other useful functions in fat replacers in relation to their final use in food products, and thus it may be preferred to use greater or lesser amounts of these than might otherwise be the optimum in relation to their stabilizing function, and/or greater or lesser amounts of different kinds of stabilizer for different product applications. For example, where the fat replacement material of the invention is intended for use in cakes and the like, then the stabilizer would generally include little or no salt and substantial amounts of sugar. Conversely in cheese spread applications, the stabilizer would contain little or no sugar, and relatively substantial amounts of salt.

Advantageously the stabilizer includes at least one food grade oil. Preferably there is used in the process of the present invention a fluid comprising: from 50 to 97% w/v liquid albumin; and from 3 to 50% w/v of at least one stabilizer selected from salt, a sugar, and optionally an oil.

In general suitable amounts of the abovementioned individual stabilizers, will be in the range of:

from 0 to 40% w/v of salt;

from 0 to 30% w/v of a sugar; and from 0 to 10% w/v of an oil.

Thus it will be understood that there may be used a stabilizer consisting of only a sugar or salt. We have found though, that when a sugar and salt are used together, there is obtained a synergistic effect on the stabilizing performance of the stabilizer component, and it is accordingly preferred to use at least some sugar together with at least some salt.

In preferred forms of the present invention there are used fluid mixtures having the following compositions before spray drying, the albumin being in liquid form:

1. Egg white albumin based material

| sugar | 1–10% w/v |
|---|---|
| salt | 2–20% w/v |
| oil | 1–10% w/v |
| albumin | 60–90% w/v |

2. Whey albumin based material

| sugar | 0.1–10% w/v |
|---|---|
| salt | 2–20% w/v |
| oil | 1–10% w/v |
| albumin | 60–90% w/v |

Specific examples of the invention which may be mentioned use the following fluid mixture compositions, the albumin being in liquid form:

1. Egg white albumin based material

| sugar | 5% w/v |
|---|---|
| salt | 10% w/v |
| oil | 1% w/v |
| albumin | 84% w/v |

2. Whey albumin based material

| sugar | 5% w/v |
|---|---|
| salt | 10% w/v |
| oil | 1% w/v |
| albumin | 84% w/v |

In the above mixtures, the amounts of liquid albumin are based on normal unmodified (with respect to water content) forms thereof. Thus, for example, naturally occurring egg white and whey typically have a solids content of around 8 to 10% w/v. Nevertheless it would in principle also be possible to use liquid albumin with a somewhat reduced or somewhat increased water content, although this would generally be less convenient. In general the fluid mixture of liquid albumin and stabilizer would have a water content in the range from 0.5 to 40% w/v, preferably from 10 to 30% w/v. Moreover, as liquid mixtures with solids contents generally in the range from 15 to 35% w/v can be readily spray dried, the solids content of typical liquid albumin+ stabilizer mixtures used in the process of the present invention, will often be suitable for spray drying without the need for any adjustment of the water content prior to spray drying.

As used herein salt normally indicates NaCl. It will nevertheless be appreciated that other physiologically salts (e.g. KCl) could also be used. Various sugars, or mixtures, thereof may also be used, including, for example, fructose, glucose, sucrose, lactose, pectin, molasses, honey, dextrin, guar gum, locust bean gum or any water soluble starch, or any other sugar suitable for use in food products. Similarly various animal ( ) or vegetable oils suitable for use in food products may be used, including, for example, sunflower oil, olive oil, soya oil, liquefied butterfat, rape seed oil, etc.

Whilst whey and egg white are particularly convenient and abundant sources of albumin, various other albumins may also be used in accordance with the present invention.

In general suitable albumins are hydrophilic globular proteins containing disulphide bonds and having a molecular weight of the order of 30–70 kilodaltons. Other suitable albumin sources include milk serum, soya protein, pea protein, and blood serum. It should also be noted that two or more different albumins may be used together.

Suitable conditions for the heat treatment may be readily determined by means of monitoring the degree of denaturation of the albumin. Various techniques are known in the art for measuring the degree of denaturation of albumin and other proteins. In one such method the denaturation degree is determined by measuring the quantity of reactive SH-groups (N. Kitabake and E. Doi: Conformational changes of hen egg ovalbumin during foam formation detected by 5,5'dithiobis(2-nitrobenzoic acid). J. Agric. Food Chem. (1987), 35 (953–975)).

In general we have found that suitable amounts of denaturation can be safely obtained by means of a thermal treatment step using a temperature of from 55 to 85° C. albeit that certain albumins such as ovalbumin prefer lower temperatures than other albumins such as whey albumin. Thus in the case of ovalbumin there is preferably used a temperature of from 55 to 70° C., whilst for whey albumin there is preferably used a temperature of from 65 to 80° C. It will be appreciated that with higher temperatures there should generally be used a shorter treatment period. Suitable treatment times would typically be from 2 to 10 minutes at from 70 to 80° C., and from 10 to 30 minutes at lower temperatures.

Preferably the heat treatment is carried out under generally neutral pH, preferably in the range from 5 to 9. If desired, the mixture may be acidified after the heat treatment step, for example, to a pH in the range from 2 to 6. Suitable food grade acids which may be used to reduce the pH of the mixture include acetic acid, conveniently in the form of vinegar.

The fat replacement materials of the present invention may be used in a wide variety of applications. Thus the products can be used as nutritive fat replacers in dairy products such as coffee whiteners, whipped toppings, frozen desserts custards, processed cheese, sour creams, yoghurt, instant breakfasts, baby foods and the like. Thanks to their heat and acid stability the products can also be used in pasteurized sauces, soups and spreads (e.g. cheese spread) and innovative soft cheeses, under pH conditions in the range from pH 2 to 8. Due to their excellent emulsifying capacity, the new products can also partially replace egg yolk in emulsions like mayonnaises and dressings, thereby lowering cholesterol content and reducing costs.

In general, the fat replacement materials of the invention will be reconstituted prior to mixing together with the other food product ingredients used in the preparation of the food product concerned, by mixing the material with water. In this connection it will be appreciated that as liquid whey generally contains considerably less albumin than does egg white, then fat replacement materials of the invention based on the former, will generally be used in a more concentrated form when reconstituted (i.e. less water added to reconstitute them), in order to obtain a given desired level of denatured albumin in the food product. Similarly, where liquid whey is used as the source of albumin, this may advantageously be concentrated in a preliminary step before use in the process of the present invention, for example by ultrafiltration, rotary evaporation, or any other convenient means known in the art. Typically the liquid whey would be concentrated around 10-fold.

The mixture of denatured liquid albumin and stabilizer is generally dried in an atomising type dryer, preferably so as to give a particle size of the order of 50 to 200 microns. The drying process effects drying of liquid by reducing or atomising the liquid feed stream containing dissolved solids into droplet form in the presence of a drying atmosphere. The atomising drier generally includes a main drying chamber, an atomiser, e.g. a spray nozzle, adapted to feed the material to be dried into the spray-drying atmosphere in the dryer chamber. In a conventional dryer, the inlet air stream is generally heated to effect drying. Typically there may be used an air temperature within the range from 168° C. to 182° C. The corresponding outlet temperature range would typically be 110° C. to 116° C. The temperature in the dryer is not critical provided that the temperature is high enough to effectively dry the products, yet insufficient to cause burning or browning. The parameters of the dryer as well as the conditions employed such as feed rate and residence time may be adjusted in generally known manner so as to avoid substantially burning or browning.

In spray drying of denatured egg white, the problem of browning of the powdered product, caused by the interaction of reducing sugars and amino acids, could arise. This problem may be generally avoided by limiting the temperature used in the thermal treatment step preferably to below 70° C. for example from 55° C. to 70° C. Ovalbumin has a covalently bound sugar unit whereas whey albumins have none. Yet the tendency for browning in whey powders is less than in egg white, although lactose, which is a reducing sugar, is present in whey. The reason is that the covalently bound sugar in egg white has an open structure and is more reactive, whereas unbound sugar, such as lactose or glucose has a ring form in solution and is less reactive. This fact supports the assumption that the addition of the reducing sugar, glucose, to proteins in the current invention do not accelerate the browning reaction. In the conventional method for spray drying of egg white no oil is added. It is postulated that in the current innovative process, the proteins are denatured in controlled manner by heating under controlled conditions in the presence of sugar, salt and/or oil stabilizer, resulting in different secondary and tertiary structures than the native proteins. The denatured proteins are unfolded, the disulfide links are broken, and the hydrophobic areas are absorbed onto the oil-droplet surface. Where an oil stabilizer is included, the fluid mixture is desirably subjected to sufficient mixing or homogenisation so that an emulsion is formed which reduces the average oil droplet size. Such factors also contribute to counteract browning of egg white during and after spray drying.

In general, for spray drying purposes, the total solids content of the liquid mixture should be within the range of 15 to 35% and have a viscosity less than 125 cps (centipoise), as measured by, for example, a Brookfield disk spindle viscometer).

A small proportion of drying agent or a flow control agent such as tricalcium phosphate, dicalcium phosphate, kaolin, diatomaceous earth, silica gel, calcium silica hydrate or mixtures thereof may advantageously be added to the fat replacement materials provided by the present invention in order to help maintain the free-flowing handling characteristics of the materials and minimise any possible degradation thereof due to moisture absorption during storage etc.

Various other additives may also be included in the fat replacement materials provided by the present invention. Thus, for example, casein and/or other high molecular weight (biological) emulsifiers could be included, albeit in view of the excellent emulsifying and other properties of the materials provided by the process of the present invention, there is normally little or no need for such additives.

Preferred forms of the dry powder fat replacement materials of the present invention typically have a composition of:

| | |
|---|---|
| sugar | 10–50% w/v |
| salt | 5–50% w/v |
| oil | 1–20% w/v |
| albumin (50 to 100% denatured and substantially non-coagulated and non-hydrolyzed) | 10–80% w/v |

In a further aspect the present invention provides a fat replacement material comprising a spray dried powder comprising an intimate admixture of 1 part by weight of from 50 to 100% denatured albumin, and from 3 to 100 parts by weight of at least one stabilizer selected from a sugar and salt.

Further preferred features and advantages of the invention will appear from the following examples provided for the purposes of illustration.

EXAMPLE 1

Process for the Preparation of Ovalbumin Based Fat Replacement Material

A fluid albumin mixture was prepared by mixing together the following ingredients:
850 kg egg white—containing 5–6% w/v egg yolk
100 kg sugar (cane or beet)
50 kg salt The egg mixture was stirred for 10 minutes at room temperature in a vacuumed container to prevent foaming. The egg mixture was pasteurised on an industrial scale pasteuriser (containing plate heat exchanger) at 63 degrees C. for a holding time of 10 minutes.

The denaturation degree, as tested by determination of the quantity of reactive SH groups, should be at least 60% compared to the unpasteurised sample (0% denaturation). As a reference level for 100% denaturation, the quantity of reactive SH-groups in a coagulated sample of the egg mixture was determined.

The pasteurisation holding time should be increased if the denaturation degree is below 60% and reduced if the denaturation degree for the egg white mixture exceeds 80%. Finally the pasteurised (heat treated) egg mixture is then spray dried in a spray drier with a centrifugal cup spray nozzle. The inlet temperature should be around 170° C. and the outlet at approximately 110° C.

EXAMPLE 2

Process for the Preparation of Mayonnaise

Standard (Prior Art) Recipe

10% w/v whole egg (4% w/v yolk, 6% w/v egg white)

10% w/v sugar

1% w/v salt

8% w/v vinegar (10% w/v acetic acid)

1% w/v spices

70% w/v oil

Modified (Fat Reduced) Recipe

10% w/v reconstituted spray dried egg mixture (3% w/v egg powder obtained according to Example 1+7% w/v water)

9% w/v sugar 0.5% w/v salt

8% w/v vinegar (10% w/v acetic acid)

1% w/v spices

40% w/v oil 31.5% w/v water

Preparation

Mix egg mixture, sugar, salt, water, spices and vinegar

Slowly add the oil while emulsifying (homogenising)

Properties of Reduced Fat Mayonnaise Compared to Standard Mayonnaise:

It has similar viscosity and texture (mouthfeel)

It has similar storage stability (no water separation at the bottom of the jar)

Fat content is reduced by 30%

Cholesterol content is significantly reduced: 4% egg yolk in standard recipe reduced to 0.5%

EXAMPLE 3

Process for the Preparation of Whey Based Fat Replacement Material

Liquid sweet whey is initially concentrated 10 fold using an evaporator at a maximum temperature of 50 degrees C. A fluid albumin mixture was then prepared using the following ingredients:
900 kg concentrated liquid sweet whey (containing 9–10% whey protein)
50 kg sugar
50 kg salt The mixture was then processed as follows:

Heat the whey mixture in a Stefan mixer while stirring to 75 degrees C. without high shear homogenization. Hold the mixture at this temperature for 5 minutes, then cool to room temperature.

The denaturation degree, as tested by determination of the quantity of reactive SH groups, should be at least 70% compared to the unheated sample (0% denaturation). As control for 100% denaturation, the quantity of reactive SH-groups in a whey mixture sample heated at 75 degrees C. for 30 minutes should be determined.

The holding time at 75 degrees C. should be increased if the denaturation degree is below 70%.

Spray dry the pasteurised egg mixture in a spray drier with a centrifugal cup spray nozzle. The inlet temperature should be around 170° C. and the outlet at approximately 110° C.

EXAMPLE 4

Process for the Preparation of Mayonnaise

The procedure of Example was followed using the fat replacement material of Example 3 in place of that of Example 1, and similar results obtained.

The invention claimed is:

1. A fat and sodium caseinate replacement material suitable for use in the manufacture of food products, which material is obtainable by a method which comprises the steps of:
   a) providing a substantially homogeneous aqueous fluid by stirring together liquid albumin and stabilizer to provide a mixture comprising from 50 to 97% w/v liquid albumin and from 3 to 50% w/v of at least one stabilizer comprising a sugar;
   b) subjecting said fluid to a controlled heat treatment at a temperature and for a period of time not less and not greater than that sufficient for obtaining from 50 to 100% denaturation of said albumin determined on the basis of the quantity of reactive —SH groups, without high shear homogenization; and
   c) spray drying of the heat treated fluid to obtain the fat and sodium caseinate replacement material, which has emulsion stabilization properties.

2. A material according to claim 1 wherein the albumin is obtained from at least one of egg white, whey, milk serum, soya protein, pea protein, and blood serum.

3. A material according to claim 2 wherein the albumin is used in the form of at least one liquid egg white and whey.

4. A material according to claim 3 wherein the fluid mixture of liquid albumin and stabilizer has a solids content in the range from 0.5 to 40% w/v.

5. A material according to claim 4 wherein said solids content is from 10 to 30% w/v.

6. A material according to claim 1 wherein said heat treatment step said temperature and time period are selected so as to provide from 55 to 90% denaturation.

7. A material according to claim 6 wherein in said heat treatment step said temperature and time period are selected so as to provide 60 to 80% denaturation.

8. A material according to claim 1 wherein the stabilizer includes a salt.

9. A material according to claim 1 wherein the stabilizer includes an oil.

10. A material according to claim 9 wherein is used at least one oil selected from sunflower oil, olive oil, soya oil, liquefied butterfat, and rape seed oil.

11. A material according to claim 1 wherein is used at least one sugar selected from fructose, glucose, sucrose, lactose, pectin, molasses, honey, dextrin, guar gum, locust bean gum or any water soluble starch, or any other sugar suitable for use in food products.

12. A material according to claim 1 wherein said at least one stabilizer is constituted by:
   from 0 to 40% w/v of salt;
   up to 30% w/v of a sugar; and
   from 0 to 10% w/v of an oil,
provided that the total amount of stabilizer component is not less than 3% w/v.

13. A material according to claim 1 wherein said fluid consists essentially of:

| | |
|---|---|
| Sugar | 1–10% w/v |
| Salt | 2–20% w/v |
| Oil | 1–10% w/v |
| liquid ovalbumin | 60–90% w/v. |

14. A material according to claim 1 wherein said fluid consists essentially of:

| | |
|---|---|
| Sugar | 0.1–10% w/v |
| Salt | 2–20% w/v |
| Oil | 1–10% w/v |
| liquid ovalbumin | 60–90% w/v. |

15. A material according to claim 1 wherein is used a stabilizer which provides a dry material composition of:

| | |
|---|---|
| Sugar | 10–50% w/w |
| Salt | 5–50% w/w |
| oil | 1–20% w/w |
| albumin (50 to 100% denaturated and substantially non-coagulated and non-hydrolyzed). | 10–80% w/w |

16. A material according to claim 1 wherein in said heat treatment step there is used a temperature of from 55 to 85° C.

17. A material according to claim 16 wherein in the case of liquid ovalbumin there is used a heat treatment temperature of from 55 to 70° C.

18. A material according to claim 17 wherein there is used a treatment time of from 10 to 30 minutes at from 55 to 70° C.

19. A material according to claim 16 wherein in the case of liquid lactalbumin there is used a heat treatment temperature of from 65 to 80° C.

20. A material according to claim 16 wherein there is used a treatment time of from 2 to 10 minutes at from 55 to 70° C.

21. A material according to claim 1 wherein the heat treatment is carried out at a substantially neutral pH, in the range from 6 to 8.

22. A food product containing a fat and sodium caseinate replacement material according to claim 1.

23. A food product according to claim 22, which food product is selected from coffee whiteners, whipped toppings, frozen desserts, custards, processed cheese, sour creams, instant breakfasts, and baby foods.

24. A material according to claim 1 wherein the heat treatment is carried out at a pH in the range from 5 to 9, inclusive.

25. A material according to claim 1 wherein said method includes the step of addition of a sugar to said albumin.

26. A material according to claim 1 which is stable agains precipitation when acidified.

27. A fat and sodium caseinate replacement material suitable for use in the manufacture of food products, which material is obtainable by a method which comprises the steps of:
   a) providing a substantially homogeneous aqueous fluid containing liquid albumin and stabilizer wherein said fluid comprises from 50 to 97% w/v liquid albumin and from 3 to 50% w/v of at least one stabilizer comprising a sugar, and, from 0 to 10% w/v (of said substantially homogeneous aqueous fluid) of an oil;
   b) subjecting said fluid to a controlled heat treatment at a temperature and for a period of time not less and not greater than that sufficient for obtaining from 50 to 100% denaturation of said albumin determined on the basis of the quantity of reactive —SH groups, without high shear homogenization; and c) spray drying of the heat treated fluid to obtain the fat and sodium caseinate replacement material
wherein the fat and sodium case mate material is substantially free of coagulation or degradation during hydrolysis.

28. A fat and sodium caseinate replacement material suitable for use in the manufacture of food products, which material is obtainable by a method which comprises the steps of:
  a) providing a substantially homogeneous aqueous fluid containing liquid albumin and stabilizer wherein said fluid comprises from 50% to 97% w/v liquid albumin and from 3 to 50% w/v of at least one stabilizer comprising a sugar;
  b) subjecting said fluid to a controlled heat treatment at a temperature and for a period of time not less and not greater than that sufficient for obtaining from 50 to 100% denaturation of said albumin determined on the basis of the quantity of reactive —SH groups; and
  c) spray drying of the heat treated fluid to obtain the fat and sodium caseinate replacement material.

29. A method of producing a fat and sodium caseinate replacement material suitable for use in the manufacture of food products, which method comprises the steps of:
  a) providing a substantially homogeneous aqueous fluid containing albumin and stabilizer wherein said fluid comprises from 50 to 97% w/v liquid albumin and from 3 to 50% w/v of at least one stabilizer comprising: a sugar, and, from 0 to 10% w/v (of said substantially homogeneous aqueous fluid) of an oil;
  b) subjecting said fluid to a controlled heat treatment at a temperature and for a period of time not less and not greater than that sufficient for obtaining from 50 to 100% denaturation of said albumin determined on the basis of the quantity of reactive —SH groups, without high shear homogenization; and
  c) spray drying of the heat treated fluid to obtain the fat and sodium caseinate replacement material.

30. A method of producing a fat and sodium caseinate replacement material suitable for use in the manufacture of food products, which method comprises the steps of:
  a) providing a substantially homogeneous aqueous fluid containing albumin and stabilizer wherein said fluid comprises from 50 to 97% w/v liquid albumin and from 3 to 50% w/v of at least one stabilizer comprising a sugar;
  b) subjecting said fluid to a controlled heat treatment at a temperature and for a period of time not less and not greater than that sufficient for obtaining from 50 to 100% denaturation of said albumin determined on the basis of the quantity of reactive —SH groups, without high shear homogenization; and
  c) spray drying of the heat treated fluid, so as to provide said fat and sodium caseinate replacement material which has emulsion stabilization properties.

31. A method of producing a fat and sodium caseinate replacement material suitable for use in the manufacture of food products, which method comprises that steps of:
  a) providing a substantially homogeneous aqueous fluid containing albumin and stabilizer wherein said fluid comprises from 50 to 97% w/v liquid albumin and from 3 to 50% w/v of at least one stabilizer comprising a sugar;
  b) subjecting said fluid to a controlled heat treatment at a temperature and for a period of time not less and not greater than that sufficient for obtaining from 50 to 100% denaturation of said albumin determined on the basis of the quantity of reactive —SH groups; and
  (c) spray drying of the heat treated fluid, so as to provide said fat and sodium caseinate replacement material which has emulsion stabilization properties.

32. A method according to claim 31, wherein said controlled heat treatment includes the step of determining the quantity of reactive —SH groups in said fluid.

33. A method according to claim 32, wherein said controlled heat treatment includes the step of terminating the heat treatment when the quantity of reactive —SH groups in said fluid has reached a level corresponding to a desired degree of denaturation within the range from 50 to 100%.

* * * * *